(12) United States Patent  
Bruhn

(10) Patent No.: US 6,700,246 B1  
(45) Date of Patent: Mar. 2, 2004

(54) TUBUTOR MOTOR

(75) Inventor: Rainer Bruhn, Ingersheim (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 54 days.

(21) Appl. No.: 09/706,490

(22) Filed: Nov. 3, 2000

(30) Foreign Application Priority Data

Nov. 5, 1999 (DE) .......................................... 199 53 200

(51) Int. Cl.⁷ ............................................... H02K 49/00
(52) U.S. Cl. ...................... 310/77; 310/93; 192/12 BA; 192/81 C
(58) Field of Search ................................ 310/75 R, 76, 310/77, 92, 93, 96, 97, 98, 80, 83, 99; 475/149, 269; 192/12 R, 12 B, 12 BA, 81 C

(56) References Cited

U.S. PATENT DOCUMENTS

| 3,669,058 A | * | 6/1972 | Shimanckas ................. 440/55 |
| 3,894,801 A | * | 7/1975 | Namba .......................... 355/66 |
| 4,587,450 A | * | 5/1986 | Ozaki ........................... 310/156 |
| 4,610,339 A | * | 9/1986 | Ciolli ............................ 192/48.92 |
| 4,652,781 A | * | 3/1987 | Andrei-Alexandru et al. 310/83 |
| 4,848,433 A | * | 7/1989 | Bresson et al. ....... 160/178.1 R |
| 5,135,086 A | * | 8/1992 | Ciolli .......................... 192/48.3 |
| 5,399,129 A | * | 3/1995 | Ciolli .......................... 475/301 |
| 5,573,472 A | * | 11/1996 | Ciolli ....................... 192/48.92 |
| 5,675,204 A | * | 10/1997 | Kusumoto et al. .......... 310/154 |
| 5,857,553 A | * | 1/1999 | Lagarder et al. ............... 192/7 |
| 6,080,075 A | * | 6/2000 | Wussow et al. ............ 475/149 |

FOREIGN PATENT DOCUMENTS

| DE | 3444946 A1 | 6/1986 |
| DE | 1 9536422 A1 | 2/1997 |
| EP | 0810347 A1 | 12/1997 |

* cited by examiner

Primary Examiner—Dang Le  
(74) Attorney, Agent, or Firm—J. Gordon Lewis

(57) ABSTRACT

A tube motor with an electric motor drive with a drive shaft located in a gear box. A reducing gear with a driven shaft is located in a gear box and coupled with the drive shaft via a gear input shaft for rotary securing of the driven shaft especially when the drive is disengaged. A wrap spring brake with a wrap spring works against the gear box, while the drive shaft and the gear input shaft work together with the wrap spring. Located between the wrap spring and the gear housing and secured against torsion is an annular element which diverts a moment introduced by the driven shaft into the gear housing.

20 Claims, 4 Drawing Sheets

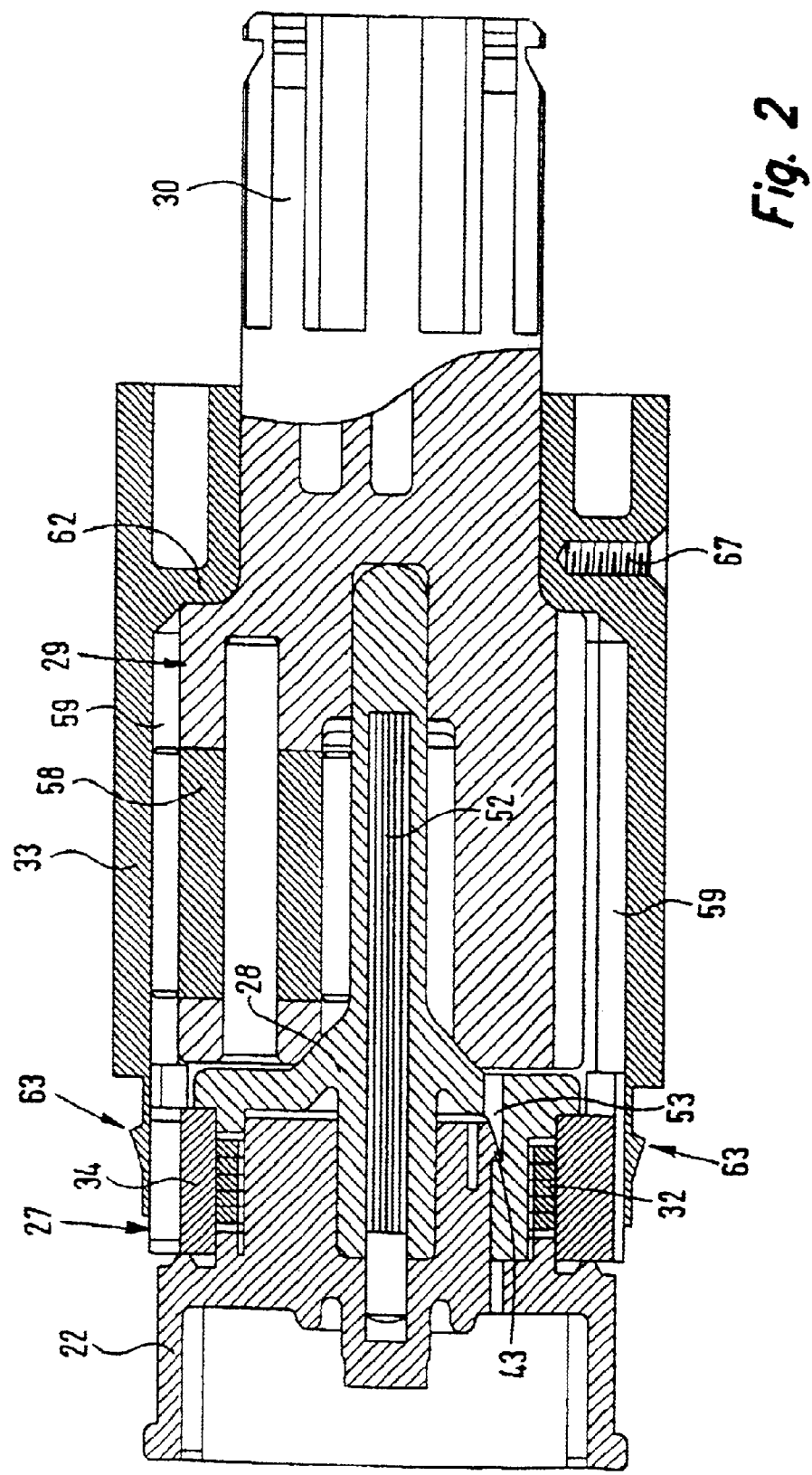

TUBUTOR MOTOR

BACKGROUND

The invention pertains to a tube motor with an electric motor drive with a drive shaft located in a gear housing, with a reducing gear with a driven shaft located in a gear box and coupled with the drive shaft via a gear input shaft, and, for rotary securing of the driven shaft especially when the drive is disengaged, with a wrap-spring brake with a wrap spring working against the gear housing, while the drive shaft and the gear input shaft work together with the wrap spring.

In particular, such tube motors are used for the electric drive of a winding shaft of a roller shutter, a slatted blind, an awning, a roller curtain, a roller door, a garage door and the like. In the case of such an arrangement, provision must be made that the driven shaft of the tube motor driving the winding shaft is secured against torsion when the drive is disengaged. In this way it is avoided that the roller shutter, for example, does not under its own weight unwind the winding shaft coupled with the driven shaft of the tube motor and independently close the shutter. For securing the driven shaft, a reducing gear for a tube motor with a wrap-spring brake is known, e.g., from EP 0,810,347 A1. The wrap spring of such a wrap-spring brake, due to its tension-release effort, positively couples the driven shaft with the gear housing when the drive shaft is not turning.

When the drive shaft is rotated by the drive, the wrap spring is contracted, whereupon the positive coupling is released and a rotation of the driven shaft by the drive becomes possible. The direct coupling of the wrap spring with the gear housing has various disadvantages. For one, due to the tension-release effort of the wrap spring, installation of the wrap spring is possible only with difficulty, e.g., only with the use of auxiliary means. Here the wrap spring must be coiled together or drawn together against its tension-release effort, in order to insert it into the offset provided therefor in the gear housing. A further disadvantage is the fact that in its installed state the wrap spring, due to its tension-release effort, presses radially against the inner side of the gear housing.

In order to be able to resist these radial forces, the gear housing must have a commensurate wall thickness or be made of a material capable of compensating for the forces, such as metal. This results in the disadvantage that the gear housing cannot be dimensionally conceived as small as desired or that, due to the material used, is unnecessarily heavy. Accordingly, the objective of the present invention is to specify a tube motor with a reducing gear, which on the one hand can be installed in a simple manner and, on the other hand, can be designed so as to be very space-saving.

SUMMARY OF THE INVENTION

In realization of this objective, a tube motor is proposed which for an annular element positioned free of torsion between the wrap spring and the gear housing, diverts a moment introduced by the driven shaft into the gear housing. The invention then has the advantage that the wrap spring can be preinstalled in the annular element so that the final installation of the tube motor and especially the reducing gear is possible in a simple manner. The tension-release effort of the wrap spring does not in any way interfere with the final installation of the tube motor.

The invention has the further advantage that, as a result of the annular element between the wrap spring and the gear housing, none of the radial forces resulting from the spring tension of the wrap spring act on the gear housing. The radial forces introduced by the wrap spring are fully absorbed by the annular element. Thus a relatively weak configuration of the gear housing is made possible. In a convenient manner, the gear housing can be made of plastic, especially as a molded part. In an especially advantageous embodiment form of the invention, provision is made for the inner side of the gear housing to have an inner toothing and the jacket surface of the annular element facing toward the inner side of the gear housing to have a matching outer toothing. By virtue of an engagement of the outer toothing of the annular element and the inner toothing of the inside of the gear housing, the annular element can be mounted on the gear housing free of torsion.

In another embodiment of the invention, the annular element can be securely seated in the gear housing. In this manner, especially during the installation of the tube motor, the annular element can be precluded from falling out of the gear housing. In another variant of the invention, provision is made for the annular element to have locking hooks or indentations on its periphery, which can then engage with locking hooks or indentations on the inner side of the gear housing. Such locking hooks or indentations provide a good anchoring of the annular element in the gear housing and can also be realized in a simple and cost-favorable maner. In particular, the annular element can be provided with recesses as reinforcement of the spring action of a locking hook, so as to preclude a plastic deformation of the annular element.

In the case of another embodiment of the invention, the reducing gear has a planetary gear drive, while the planetary gear drive has a sun wheel as its gear input shaft. Precisely by way of a planetary gear drive, a very high reduction with slight frictional losses is possible. Here the sun wheel as the gear input shaft works directly together with the driven shaft and the wrap-spring brake.

In such a configuration of the invention, the planetary gear drive has planets that roll off on the inner toothing of the inner side of the gear housing. Then the inner side of the gear housing has a double function. On the one hand, the planets roll off on the housing and, on the other hand, the housing serves to prevent torsion of the annular element.

Another embodiment form of the invention is characterized in that side of the sun wheel facing the wrap spring has several, especially two, semicircular, curved lands, around which the wrap spring is positioned. This provides the coupling of the sun wheel with the wrap spring. Advantageously, a land has a shoulder for receiving the one end of the wrap spring oriented on the longitudinal axis of the tube motor. This opposes a possible clamped binding of the one end of the wrap spring.

Another embodiment of the invention proposes that the side of the driven shaft facing toward the wrap spring have several, especially two, engagement lands, which fit with a definite play into the free spaces between the lands of the sun wheel. The defined play between the lands and the engagement lands is necessary to make possible a turning together and, therefore, also a disengagement of the positive closure between the wrap spring and the annular element. Another configuration of the invention provides that one engagement land has a shoulder for receiving the other end of the wrap spring oriented on the longitudinal axis of the tube motor. This then prevents a clamped binding of the other end of the wrap spring.

In an advantageous manner provision can be made according to the invention for the sun wheel to have a core. Especially when the sun wheel is made of plastic, a core can increase the torsion transferable by the sun wheel.

Such a core advantageously has a hexagonal cross section or a Torx cross section. It is precisely these cross sections that are well suited for transferring high moments of torsion. In the case of another, also very advantageous embodiment of the invention, a toothed wheel-work is present between the drive and the drive shaft. With such a prepositioned wheel-work, the reduction of the tube motor can be significantly improved. With the combination of the toothed wheel-work with the planetary gear drive, reduction ratios of 1:40 can be realized. In such a configuration, the wrap spring does no work directly on the driven shaft; but, rather, between the toothed wheel-work and, e.g., the planetary gear drive. With the reduction of the wheel-work lesser forces are applied to the wrap spring, so that the wrap spring can be advantageously dimensioned smaller.

Here provision can be especially made for an obliquely toothed pinion mounted directly on the drive, which drives at least one cogwheel running axially to the drive shaft. This pinion can advantageously have a diameter of a few millimeters and an extremely oblique toothing. In further refinement of the toothed wheel-work, the one minimal cogwheel is rotationally mounted on a wheel-work axis, while this wheel-work axis is located on the side of the gear box facing toward the wrap-spring brake. Such an arrangement of the wheel-work axis is advisable since the position of the gear box in relation to the pinion is unalterable.

In order to achieve greater reduction of the toothed wheel-work, the one minimal cogwheel has a second reducing stage, which is designed as a pinion and drives a ring gear. Because of the very restricted space conditions in a tube motor, the use of a ring gear as an additional reducing stage is advisable.

In an especially advantageous embodiment form of the toothed wheel-work, two symmetrically arranged cogwheels are present, each of which has a second reducing stage and drives a common ring gear. With such a symmetrical configuration, undesirable forces are especially well compensated.

In yet another embodiment of the invention, the side of the ring gear remote from the drive conveniently forms the drive shaft working together with the wrap-spring brake and the drive input shaft, especially the sun wheel. A tube motor with very favorable and functionally safe characteristics is made available thereby.

Furthermore, provision can be advantageously made according to the invention for the individual components of the tube motor to be locked together for the final assembly of the tube motor. Then the assembly of the tube motor can be accomplished without special tools, which is also favorable in the event of disassembly of the tube motor. This works against the individual components of the tube motor simply falling out.

DETAILED DESCRIPTION OF THE DRAWING

Additional advantageous embodiments and details of the invention are set forth in the following description, which is described in greater detail and explained with references to the embodiment examples illustrated in the appended drawings in which:

FIG. 2 is a longitudunal section view of the planetary reducing gear with wrap-spring brake of the tube motor according to FIG. 1;

DETAILED DESCRIPTION

Figure 1:
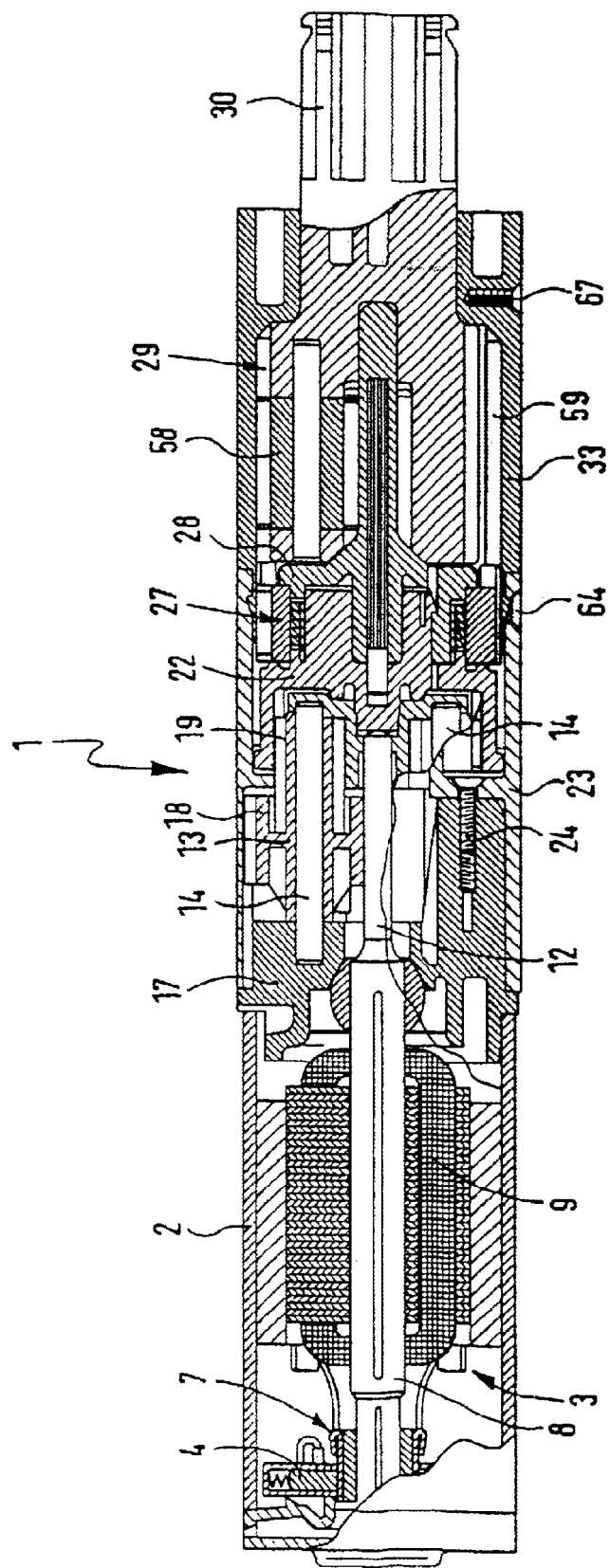
FIG. 1 is a longitudinal section view through a tube motor according to the invention.

FIG. 1 shows a tube motor 1 with an electric motor drive 3 in a motor housing 2. This drive 3 has brushes 4 in contact with a collector 7. Also clearly shown is a drive shaft 8 on which a rotor 9 is mounted. Present on the free end of the drive shaft 8 is a pinion 12 with oblique toothing. Driven by the pinion 12 are two symmetrically arranged cogwheels 13, which run axially to the drive shaft 8. Only one cogwheel 13 can be seen in FIG. 1, since the sectioning line is in the area of the second cogwheel in which the second cogwheel does not lie.

The cogwheels 13 are rotationally mounted on the cogwheel axes 14. The cogwheel axes 14 are in turn mounted on a gear retainer 17 located on the open face of the motor housing 2 facing toward pinion 12. The gear retainer 17 then forms the frontal part of the motor housing 2 and is nondetachably joined to the motor housing 2. Each of the cogwheels 13 has two reducing stages, namely one reducing stage 18 that meshes with the pinion 12 and a second reducing stage 19, which is designed as an interior pinion and drives a ring gear 22. The toothed wheel-work located behind the drive shaft 8 of the drive 3 is covered by a tube-like cover part 23 and screwed together with the gear retainer 17 by means of a fastening screw 24. The ring gear 22 thus driven then works together with a wrap-spring brake 27 and with a sun wheel 28 of a reducing gear, namely a planetary gear drive 29 with a driven shaft 30, in such a way that driven shaft 30 is secured against rotation by means of the wrap-spring brake 27 when the drive 3 is disengaged. FIG. 2 depicts the reducing gear, namely the planetary gear drive 29, in an enlarged view clearly shown are the ring gear 22 and the sun wheel 28 working together, with the ring gear 22. Located between the ring gear 22 and the sun wheel 28 is the wrap-spring brake 27. The wrap-spring brake 27 has a wrap spring 32 and an annular element 34 located between a gear box 33 and the wrap spring 32 mounted on the gear box 33 so as to be free of torsion.

Figure 4:
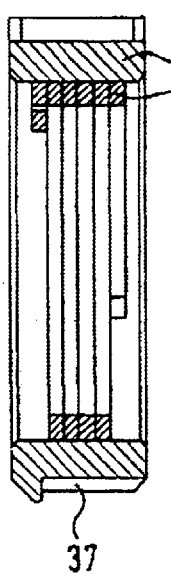
FIG. 4 is a cross-sectional view taken along Line A—A in FIG. 3.
Figure 3:
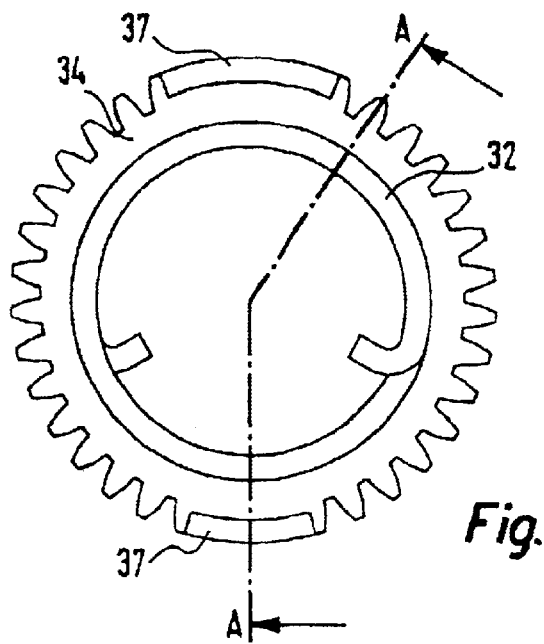
FIG. 3 is a plan view of the wrap spring and the annular element.

The wrap spring 32 and the annular element 34 are shown as individual parts in FIGS. 3 and 4, respectively. It can be clearly seen that an outer toothing is provided on the jacket surface of the annular element 34. In FIG. 3, in which the annular element 34 is depicted in frontal view, it can also be seen that the wrap spring 32 has two free ends, which are oriented in the direction of the longitudinal axis of the annular element 34 or the overall tube motor 1.

The peripheral area of the annular element 34 has two recesses 37 that are provided for receiving locking hooks and should make possible a locking of the annular element 34 on the gear box 33. In FIG. 4 as well, which depicts a cut along the line A/A in FIG. 3, a recess 37 is clearly evident. Due to the tension-release tendency of the wrap spring 32, the wrap spring 32 presses radially against the inside of the annular element 34. Then a turning of the wrap spring 32 in relation to the annular element 34 is possible only when the wrap spring 32 is turned against its tension-release tendency.

Figure 6:
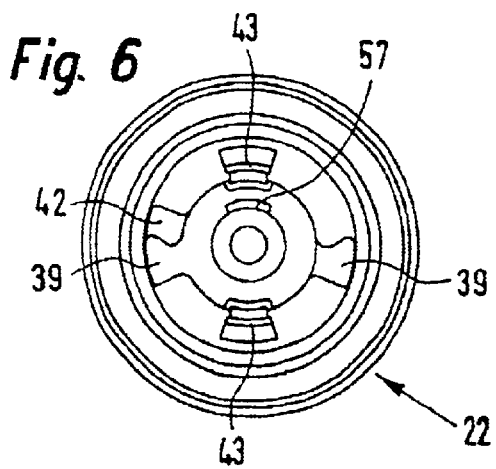
FIGS. 5–7 are views of the ring gear of the tube motor according to FIG. 1.
Figure 5:
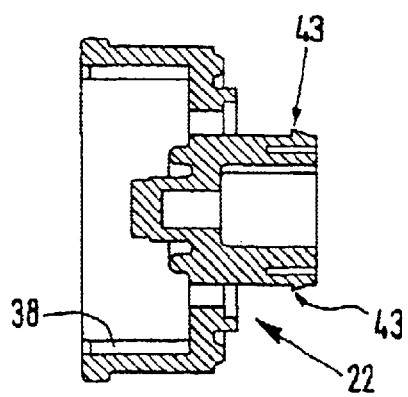
Figure 7:
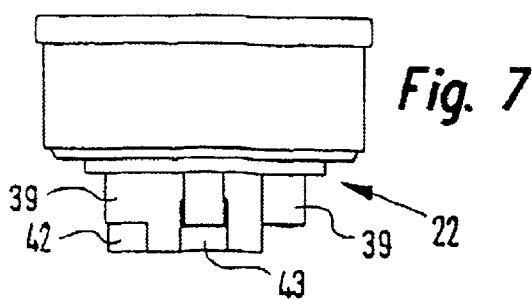
Figure 12:
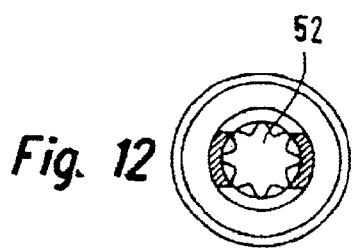
Figure 10:
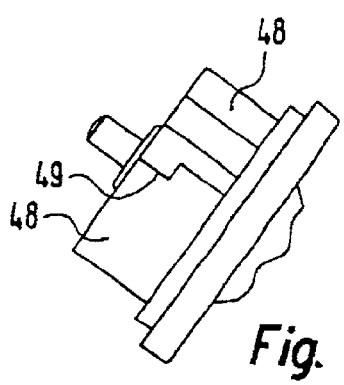
Figure 11:
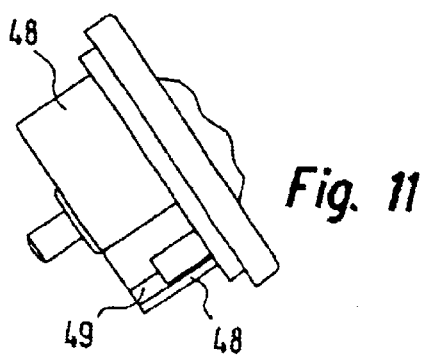

Shown in FIGS. 5, 6 and 7 is the ring gear 22. The ring gear 22 has an inner toothing 38 which meshes with the reducing stage 19 of the cogwheels 13. In FIG. 6, in which a top view of the ring gear 22 is depicted, two engagement lands 39 can be clearly seen. These engagement lands 39 are provided for engaging the free ends of the wrap spring 32. By virtue of this engagement of the free ends of the wrap spring 32 the wrap spring 32 is compressed, so that it is possible for the wrap spring 32 to rotate in relation to the rotationally stationary annular element 34. Here the one engagement element 39 has a shoulder 42 for receiving the one end of the wrap spring 32. In FIG. 7, which depicts a side view of the ring gear 22, this shoulder 42 is also clearly shown Also shown in FIG. 5 are locking hooks 43, by means of which the ring gear 22 can be locked onto the sun wheel 28. This particularly prevents the ring gear 22 from falling out of the sun wheel 28. It is evident in FIG. 8 that the sun wheel 28 has two component sections, namely a toothed section 44 with toothing and a coupling section 47 working together with the wrap-spring brake 27. The side of the sun wheel 28 facing toward the wrap spring 32 or the coupling section 47 has two lands 48 that are circularly curved when viewed in cross section, which are also clearly evident in FIG. 9, which is a frontal view of the sun wheel 28, as well as in FIGS. 10 and 11, which depict the two views (X) and (Y) according to FIG. 9. In the assembled state of the tube motor, as is especially depicted in FIG. 2, the wrap spring 32 is positioned around the two curved lands 48. One of the lands 48 has a shoulder 49 for receiving the other free end of the wrap spring 32. In the assembled state of the tube motor 1, the two engagement lands 39 engage in the free spaces between the lands 48 of the coupling section 47 of the sun wheel 28. However, a certain play, i.e., a defined additional free space, must be provided between the lands 48 and the engagement lands 39 in order to permit a rotary compression of the wrap spring 32 over the engagement lands 39. As can be seen in FIG. 12, which depicts a cut along the line B/B in FIG. 8, the sun wheel 28 has a core 52 along its axis. The core 52 is preferably made of steel and has a Torx cross section, which matches the outer toothing,of the toothed section 44. This makes it possible for the transfer of very high moments of torsion despite the lesser dimensioning of the sun wheel 28, which is preferably made of plastic.

Figure 8:
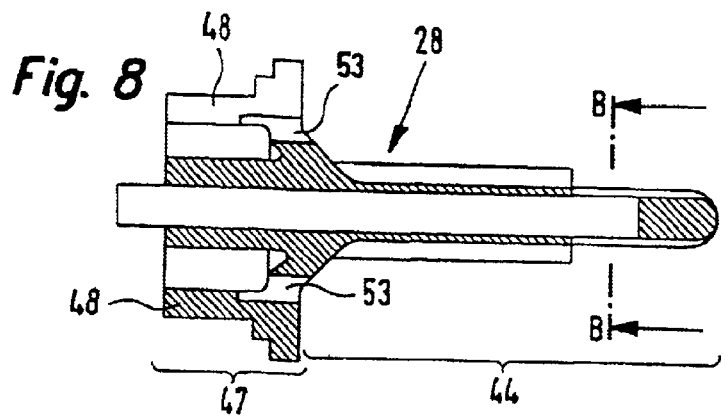
FIGS. 8–12 are various views of the sun wheel of the tube motor according to FIG. 1.
Figure 9:
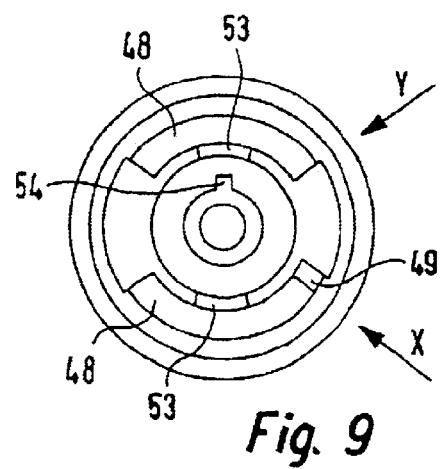

Also clearly shown in FIGS. 8 and 9 are locking indentations 53, in which the locking hooks 43 of the ring gear 22 can engage. As an installation aid, the sun wheel 28 has an assembly land 54, which is clearly evident especially in FIG. 9. For installing the ring gear 22 and the sun wheel 28, the assembly land 54 is inserted into an assembly groove 57 provided for this purpose on the ring gear 22. Assurance is given thereby that the tube motor 1 is can be assembled so as to be functionally safe.

As shown in FIG. 2, the sun wheel 28 drives three planets 58, although only one planet is depicted in the section according to FIG. 2. The planets 58 roll of on an inner toothing 59, which is present on the inner side of the gear box 33. This inner toothing 59 extends from the side of the gear box 33 facing toward the ring gear 22 to a shoulder 62, which axially bears the driven shaft 30. The outer toothing of the annular element 34 matches the inner toothing 59, so that the annular element 34 can be inserted for installation in the toothing 59.

For the assembly of the planetary gear drive 29 shown in FIG. 2 and the cover part 23, the gear box 33 has a locking hook 63, which can engage in the locking indentations 64 on the cover part 23, which are shown in FIG. 1. When the drive 3 is disengaged, a moment of torsion introduced via the driven shaft 30 is transferred by the planetary gear drive 29 to the sun wheel 28. As a result of the working together of the coupling section 47 of the sun wheel 28 and the wrap spring 32 located in the annular element 34, the wrap spring 32 is expanded and the positive closure between the wrap spring 32 and the annular element 34 is intensified. The radially applied forces are then absorbed by the annular element 34.

The transferred moment of torsion is diverted into the gear box 33 via the outer toothing of the annular element 34 and the inner toothing 59 of the gear box 33. As clearly shown in FIG. 1 and FIG. 2, the section of the gear box 33 encompassing the annular element 34 can be dimensioned very thin. Conveniently, the gear box 33 is screwed together with, e.g., a tube encompassing the tube motor by means of a fastening screw passing through a screw bore 67.

All of the characteristics presented in the description, the following claims and the appended drawings can have inventive merit both individually and in any given combination.

What is claimed:

1. A tube motor comprising:
    an electric motor drive with a drive shaft located in a motor housing;
    a reducing gear a driven shaft coupled with the drive shaft via a gear input shaft;
    a gear box supporting the reducing gear and the driven shaft; and
    a wrap-spring brake working against the gear box, including a wrap spring securing the driven shaft against rotation upon disengagement of the electric motor drive and an annular element mounted free of torsion on the gear box and positioned between the wrap spring and the gear box, the annular element diverting into the gear box a moment of torsion introduced by the driven shaft.

2. The tube motor according to claim 1, wherein the inner side of the gear box has an inner toothing and a jacket surface of the annular element facing toward the inner side of the gear box has a corresponding inner toothing.

3. The tube motor according to claim 1, wherein the annular element is locked into the gear box.

4. The tube motor according to claim 1, wherein the planetary gear drive has a sun wheel as the gear input shaft and the side of the sun wheel facing toward the wrap spring has a plurality of lands curved in cross section, around which the wrap spring is positioned.

5. The tube motor according to claim 4, wherein the planetary gear drive has planets, which roll off on the inner toothing on the inner side of the gear box.

6. The tube motor according to claim 4, wherein the sun wheel has a core, the core and the sun wheel comprising different materials.

7. The tube motor according to claim 4, wherein the sun wheel has a core and the core has one of a hexagonal cross section and a Torx cross section.

8. A tube motor comprising:
    an electric motor drive with a drive shaft located in a motor housing,
    a reducing gear with a driven shaft coupled with the drive shaft via a gear input shaft;
    a gear box supporting the reducing gear and the driven shaft and
    a wrap-spring brake working against the gear box, including a wrap spring securing the driven shaft against rotation upon disengagement of the electric motor drive and an annular element positioned between the wrap spring and the gear box, the annular element diverting into the gear box a moment of torsion introduced by the driven shaft and the annular element has one of locking hooks and locking indentations on its periphery which can be engaged together with one of locking indentations and locking hooks respectively located on the inner side of the gearbox.

9. A tube motor comprising:

an electric motor drive with a drive shaft located in a motor housing;

a reducing gear with a driven shaft coupled with the drive shaft via a gear input a gear box support the reducing gear and the driven shaft; and a wrap-spring brake working against the gear box, including a wrap spring securing the driven shaft against rotation upon disengagement of the electric motor drive and an annular element positioned between the wrap spring and the gear box, the annular element diverting into the gear box a moment of torsion introduced by the driven shaft and wherein the reducing gear has a planetary gear drive, and the planetary gear drive has a sun wheel as the gear input shaft and the side of the sun wheel facing toward the wrap spring has a plurality of lands cave in cross section, around which the wrap spring is positioned.

10. The tube motor according to claim 9, wherein one land has a shoulder for receiving the one end of the wrap spring oriented on the longitudinal axis of the tube motor.

11. The tube motor according to claim 9, wherein the side of the driven shaft facing toward the wrap spring has a plurality of receiver lands, which engage with a defied play in the free spaces between the lands of the sun wheel.

12. The tube motor according to claim 11, wherein one receiver land has a shoulder for receiving the other end of the wrap spring oriented on the longitudinal axis of the tube motor.

13. The tube motor according to claim 11, further comprising:

a cogwheel gear positioned between the drive and the drive shaft.

14. The tube motor according to claim 13, wherein the drive shaft of the drive has an obliquely toothed pinion, which pinion drives at least one cogwheel running axially to the drive shaft.

15. The tube motor according to claim 14, wherein at least one cogwheel is rotatably mounted on a cogwheel axis and that the cogwheel axis is located on the side of the gear box facing toward the wrap-spring brake.

16. The tube motor according to claim 14, wherein at least one cogwheel has a second reducing stage designed as a pinion driving a ring gear.

17. The tube motor according to claim 16, wherein the side of the sing gear remote from the drive forms the drive shaft working together with the wrap-spring brake and the gear input shaft.

18. The tube motor according to claim 14, including two symmetrically arranged cogwheel, each of which has a second reducing stage and drives a ring gear.

19. In a tube motor including an electric motor drive mounted on a drive shaft and a reducing gear coupling the drive shaft with a driven shaft located in a gear box, the improvement comprising:

a wrap-spring brake securing the driven shaft from rotating opposite a direction of rotation of the electric motor drive, the wrap-spring brake including:
 a wrap spring operatively coupled to the driven shaft; and
 an annular element fixedly mounted in the gear box and surrounding the wrap spring, the annular element absorbing a moment of torsion resulting from the effort of the driven shaft to rotate opposite the direction of rotation of the electric motor drive.

20. The improvement of claim 19, wherein the reducing gear includes a planetary gear assembly, the improvement further comprising:

a sun wheel including:
 a gear input shaft driving at least one planet of the planetary gear assembly, and
 at least one land radially disposed from the gear input shaft; and wherein the wrap spring is positioned around and engageable with the at least one land to rotate with the sun wheel in the direction of rotation of the electric motor drive.

* * * * *